United States Patent [19]
Nowell

[11] Patent Number: 4,843,478
[45] Date of Patent: Jun. 27, 1989

[54] TUNABLE FILTER CIRCUIT FOR FACSIMILE RECORDERS

[75] Inventor: Scott Nowell, Brookline, N.H.

[73] Assignee: Alden Electronics, Inc., Westboro, Mass.

[21] Appl. No.: 131,920

[22] Filed: Dec. 9, 1987

[51] Int. Cl.[4] .............. H04N 1/21; H04N 1/40; H04N 1/32

[52] U.S. Cl. .................... 358/257; 358/280; 358/296

[58] Field of Search .............. 358/257, 300, 302, 263, 358/280

[56] References Cited

U.S. PATENT DOCUMENTS 3,920,895 11/1975 Vieri ........................... 358/257
3,920,896 11/1975 Bishop ......................... 358/257

Primary Examiner—E. A. Goldberg
Assistant Examiner—Scott A. Rogers
Attorney, Agent, or Firm—James H. Grover

[57] ABSTRACT

An electronic system for processing graphic teletype coded signals or graphic facsimile signals in different modes of frequency modulation comprises two filter channels passing different frequency modulated or keyed bands, two filter channels respectively passing signals from the two bands to a pulse shaper which produces a pulsed signal corresponding to the outputs of the filter channels, and channels respectively coupling the output of one filter channel and of the shaper to a facsimile recorder.

16 Claims, 3 Drawing Sheets

TUNABLE FILTER CIRCUIT FOR FACSIMILE RECORDERS

Reference is made to the co-pending application of Gerald L. Vano, Ser. No. 831,842, entitled TELETYPE COMPATIBLE FACSIMILE RECORDER.

BACKGROUND OF THE INVENTION

Facsimile signals representing graphic original material are generated by scanning the graphic original line by line to produce a rectangular array of generally parallel horizontal lines known as a raster familiar on television screens. Each line of the raster is a series of analog or digital pulses. The facsimile recorder which receives the facsimile signals prints them line by line on sensitive paper fed by a linear printing head.

Teletype (Trademark) signals represent alphanumeric characters of a predetermined configuration as compared to the random graphic elements of a facsimile weather map, for example, and are transmitted in a seven bit on-off code with a combination of five to twelve pulses for each character. Such coded on-off pulses would be recorded unintelligibly if applied to a conventional facsimile recorder because they are not in raster form.

Further recording problems arise not only because of differences in coding but also because of different modes of modulating the coded signals for transmission over radio and land lines.

Teletype signals are conventionally transmitted in a first form of frequency modulation termed frequency shift keying, wherein a signal is modulated between two frequencies or tones which are separated by a known amount and are relative to a carrier frequency, wherein the ON or MARK portion of a code pulse is represented by the frequency or tone closer to the carrier frequency, whereas the OFF or SPACE portion of a code pulse is represented by the second frequency or tone further from the carrier frequency. Teletype signals are usually printed by a teletype machine specifically designed to accept the Teletype code and frequencies.

Facsimile signals, as compared to teletype signals, may represent various tone shades or density levels of the original graphic material in the range from white to black with intermediate gray levels. The signals may therefore be transmitted as a relatively wide band of frequencies representing the various white-to-black shades of gray. However, some facsimile recorders, thermal printers for example, are capable only of marking thermal recording paper with near-black marks separated by unmarked white spaces.

Graphic signals are thus transmitted in these different pairs of frequency bands for Teletype and another different frequency band for facsimile presenting a problem of how to receive and process both Teletype and facsimile signals and print them on a facsimile recorder, and it is the object of the present invention to receive both forms of signals and print them on a facsimile recorder, particularly a thermal recorder for marking paper which contrasts only black and white tones.

SUMMARY

According to the invention an electronic processor of graphic signals for application to a facsimile recorder comprises a primary input for signals in either of two different modes of frequency modulation; first and second filter channels coupled to the primary input and respectively passing different frequency bands of the input signal and having two filtered outputs corresponding to the different passed bands; a pulse shaper with a pulse output and with two inputs respectively coupled to the two filtered outputs and responsive thereto to produce a pulsed signal corresponding to both filtered outputs; a first signal channel for coupling the output of one filter channel to a facsimile recorder; and a second signal channel for coupling the pulse output of the shaper to the recorder, whereby signals of two frequency modulation modes are converted to a common mode of pulse modulation.

Further according to this invention the filter channels are tunable to pass different frequency bands and the processor includes means responsive to the mode of the input signal to apply tuning signals to the filter channels.

DRAWINGS

DESCRIPTION

Figure 1:
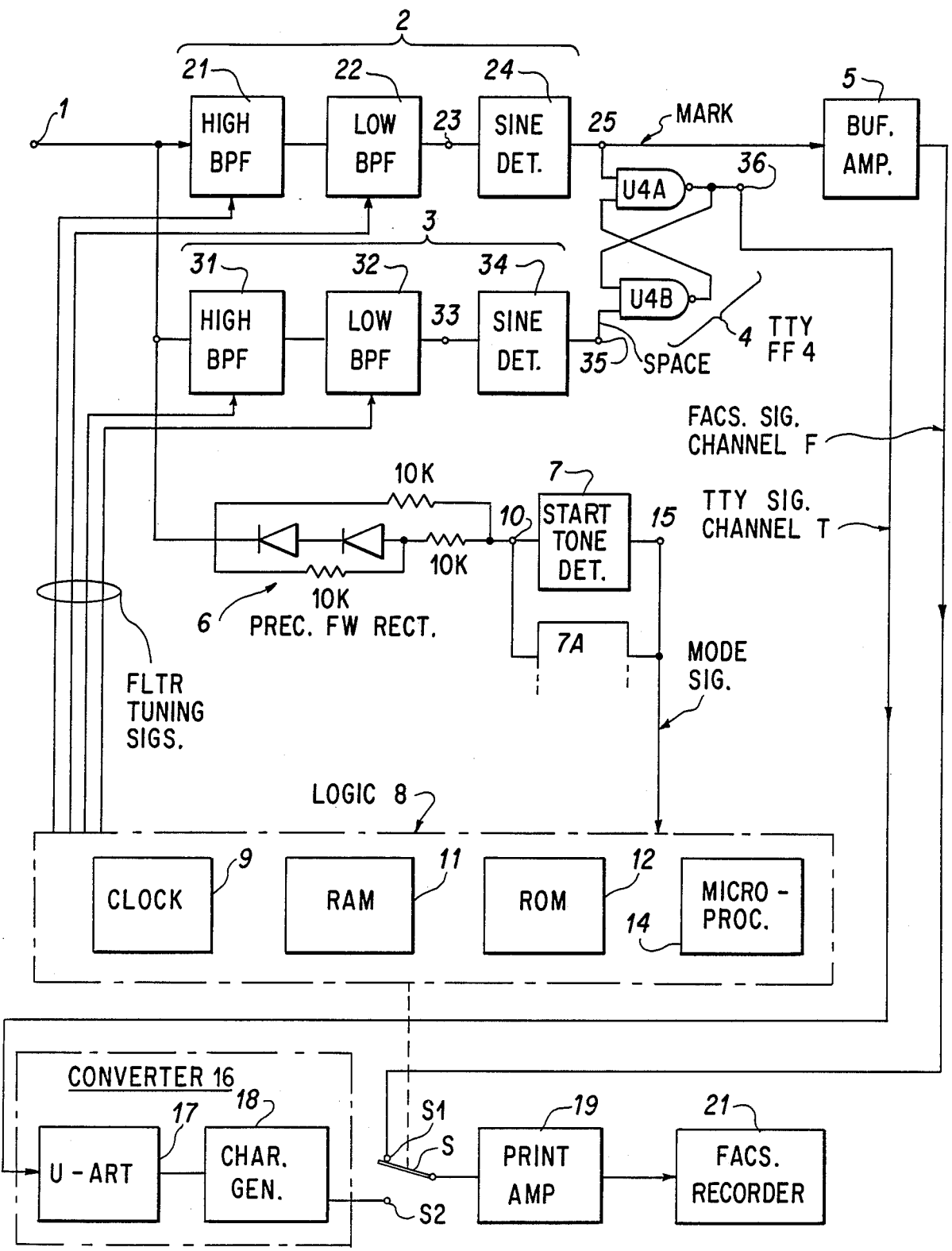
FIG. 1 is a schematic diagram of a facsimile recording system according to the invention.

The system shown in FIG. 1 has an input terminal 1 to which both facsimile Teletype and signals are supplied via radio, telephone or other lines. Whichever signal is received is applied to two tunable filter channels 2 and 3, the first of which, a low frequency band pass channel, selects only a narrow low frequency band of the input signal, and the second selecting a narrow high frequency band. Each tunable filter channel includes a high pass filter 21 and 31 respectively and a low pass filter 22 and 32 respectively. Each filter pair 21, 22 and 31, 32 precisely selects a narrow frequency band of the incoming signal and passes the selected waveform to a terminal 23 or 33 corresponding to the digital content of the facsimile or Teletype information.

The filter channels 2 and 3 respectively include sine wave detectors 24 and 25 which rectify the selected waveform to approximately square form at filter channel outputs 25 and 35. The first pair of tunable filters 21 and 22 and a buffer 5 are in a facsimile signal channel F connected to one contact S1 of a selector switch S. The first and second pairs of tunable filters 31, 32 are in a Teletype channel, signal channel T through the filter output terminal 33, a teletype flip-flop 4 and a converter 16 to a second contact.S2 of the selector switch S and connected in a known set-reset, flip-flop configuration serving to refine the filtered signals at terminals 23 and 33 to a noise free coded pulse signal at the flip-flop output terminal 36.

Figure 7:
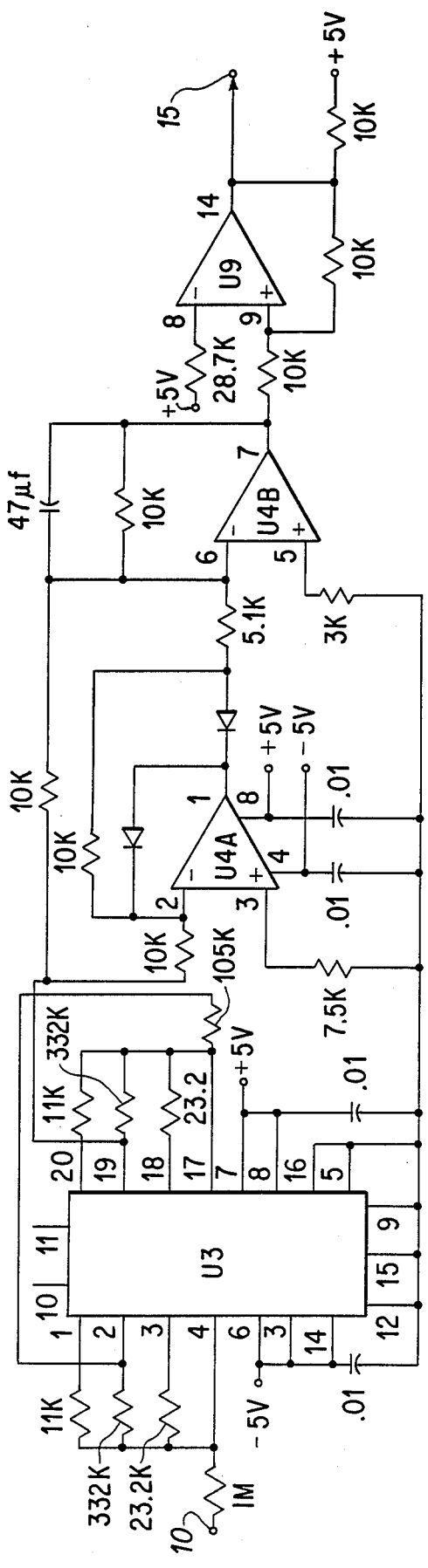
FIG. 7 is a schematic drawing of a start tone detector of the system of FIG. 1.

The signal at the input terminal 1 is also applied through a precision full wave rectifier 6 to a parallel set of stages 7, 7A, etc. each of which detects the distinctive start tone of one of the incoming facsimile or Teletype signals. The start tone occurs at the beginning of each frame or page of facsimile or Teletype signals and initiates the recording of that frame or page. Also the particular stage 7 or 7A or other delivers a mode signal to a logic system 8, which informs the logic system whether a facsimile or teletype signal will follow. FIG. 7 shows a suitable start tone detector compromising an integrated circuit type MF10CN from National Semiconductor Corporation, Santa Clara, Calif., connected in a circuit as shown to operational amplifiers U4A and U4B, each one stage of an integrated circuit type TL072 from Texas Instruments, Inc., Dallas, Tex., and U9, type LM339 from National Semiconductor Corporation.

The logic system 8 includes a clock 9, a random access memory (RAM) 11, a read only memory (ROM) 12 and a microprocessor 14 which process the incoming mode signal in a conventional manner and transfer the selector switch 5 according to whether a facsimile or Teletype signal is received. The logic system also supplies a filter tuning signal to the tunable filters 2 and 3 appropriate to the type of facsimile or Teletype signal received.

The teletype channel includes a converter 16 which responds to coded Teletype signals by producing corresponding graphic signals in raster form. The conversion is processed by a Universal Asynchronous Receiver Transmitter (UART) 17, type I8251 available from Intel Corporation, Santa Clara, Calif., which converts the serial form of coded Teletype signals to parallel format. The parallel signals are applied to a character generator 18 such as model DM76S64 bipolar character generator available from National Semiconductor Corporation. This character generator comprises a look up table which responds to the parallel output of the UART to read out signals in line-by-line, raster, format at the alternative contact S2 of the selector switch S.

According to the signal mode, Teletype or facsimile, used by the logic system 8 to transfer the selector switch S, the selected facsimile or Teletype signal in raster scan format is applied through a power amplifying printer drive 19 to a conventional facsimile raster format recorder 21.

Figure 2:
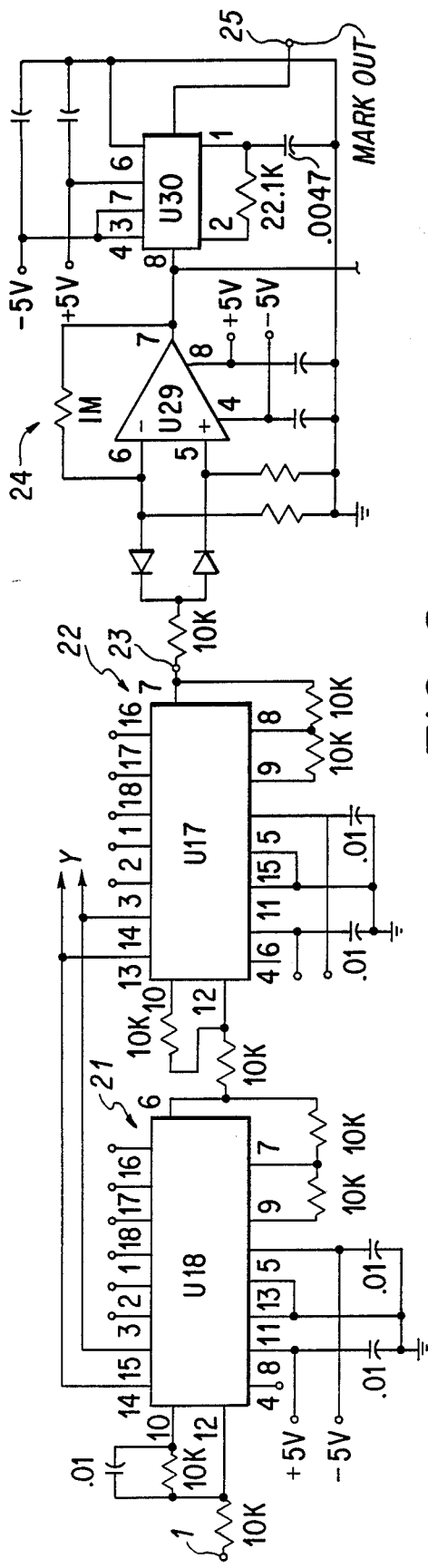
FIGS. 2 and 3 are schematic diagrams of tunable filter channels in the recording system of FIG 1.
Figure 3:
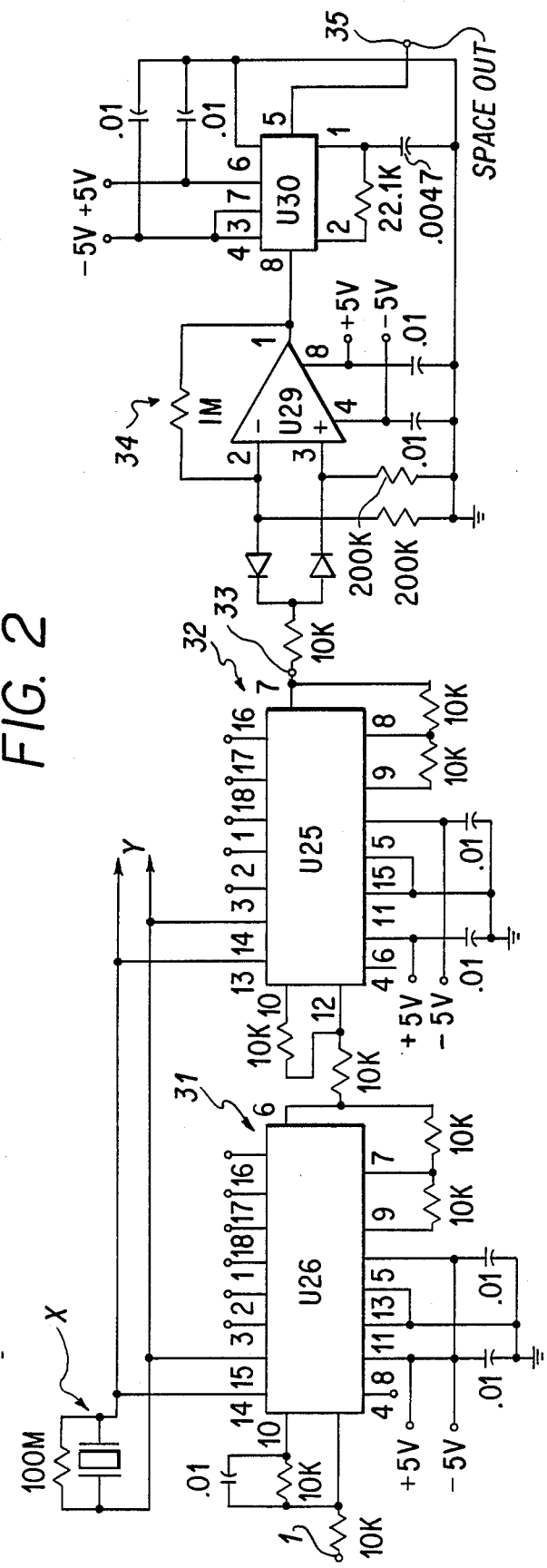

The tunable filter channels 2 and 3 of FIG. 1, shown in detail in FIGS. 2 and 3, comprise high band pass programmable or tunable filters U18 and U26 type S3529, and tunable U17 and U25, type S3528, available from Gould AMI Semiconductors, Santa Clara, Calif. The high band pass filter U18 and U26 have input pins 1, 2, 3, 16, 17, and 18 through which a narrow frequency digital code representing a pass band value is stored in the filter from the logic 8 along the filter tuning signal lines (FIG. 1) along the same lines a latch signal enters pin 4 causing the filter value to be entered. Similarly filter values are entered through pins 1, 2, 3, 4, 16, 17, 18 of the low band pass turnable filter U17 and U25.

The frequencies to which the filters are tuned are determined by the transmitted signals. Teletype signals are modulated between two frequencies with the first or MARK frequency representing a logic 1, being 1275 hertz. The second or SPACE frequency representing a logic 2, being shifted either 170, 425 or 850 hertz higher than the MARK frequency, resulting in a SPACE frequency of 1445, 1700 or 2125 hertz respectively. These frequencies are well defined and accurately demodulated and as such, the band pass the filters are tuned to is correspondingly narrow to exclude noise and other extraneious signals.

Figure 4:
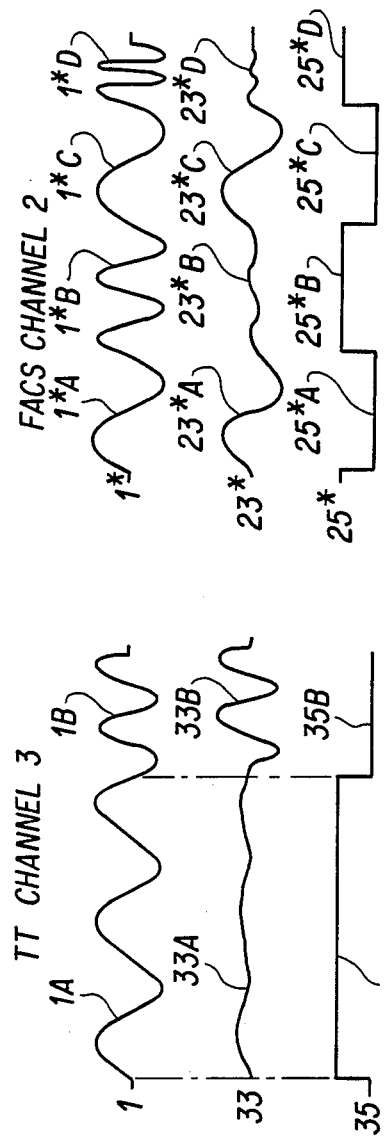
FIGS. 4 to 6 are wave forms of Teletype and facsimile voltages in the tunable filter channels.
Figure 5:
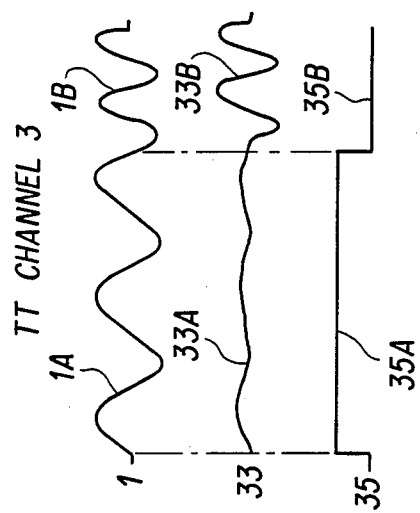
Figure 6:
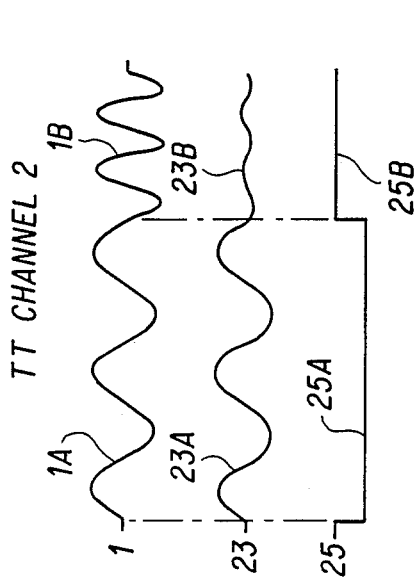

The filtering affect on Teletype signals is illustrated by the voltage waveforms of FIGS. 4 and 5 in the two tunable channels 2 and 3. The signal at the primary input terminal 1 is the same for both channels, consisting of low frequency portions 1A and high frequency portions 1B. For Teletype signals the high band pass filter 21 (U18) of the first tunable channel 2 will, in order to select the 1275 hertz logic 1 signal, be tuned to reject frequencies higher than 1285 hertz, while the low band pass filter 22 (U17) rejects signal frequencies lower than 1265 hertz, for example. This very narrow frequency band selection discriminates highly in favor of the black MARK, lower frequency signal 1A and against the SPACE, higher frequency signal 1B, so that the filtered output 23 of the first filter channel 2 consist of a strong low frequency MARK signal 23A and a highly attenuated SPACE signal 23B as shown in FIG. 4.

Conversely, but in the same manner as just described, the second filter channel 3 receives the same primary input signal with high and low frequency components 1A and 1B but discriminates against the low, and in favor of the high frequency components as shown by waveforms 33A and 33B of FIG. 5 appearing at the second filtered outlet 33. Like the first channel 2 the two filters 31 and 32 of second channel 3 are tuned to reject high and low frequencies outside the upper and lower frequency limits to which they are tuned by signals from the logic 8.

FIGS. 2 and 3 schematically show the first and second filter channels. In both channels the high pass filters 21 and 31 comprise integrated circuits U18 and U26, type 53529 of Gould AMI Semiconductors, Santa Clara, Calif. The low pass filters U17 and U25 are Gould type 53528. In each channel the filtered inputs at points 23 and 33 corresponding to the different passed bands are applied respectively to sine wave detectors 24 and 34 which rectify the sine wave components 23A and 33A to produce roughly on-off pulsed or square voltage waveforms 25A and 35A at the respective outputs 25 and 35 of channels 2 and 3, corresponding to the two, different bands passed by the channels. As shown in FIGS. 2 and 3 each sine detector comprises a full wave rectifier U29, one half of a type TL072 integrated circuit from Texas Instruments, Inc. and a 4th order Butterworth filter, type MF4 from National Semiconductor Corporation. These stages reduce noise and other unwanted frequencies at the filter channel onputs 25 and 35.

The filtered output 25 carrying the black mark signal 25A is coupled by a buffer stage 5 through a continuation of the facsimile signal channel F to the facsimile contact S1 of the selector switch S.

The Teletype signal channel T to the other contact S2 of the selector switch is supplied through a flip-flop pulse shaper connected to both filtered outputs 25 and 35 of the tunable filter channels 2 and 3. A suitable flip-flop comprises two NAND gates U4A and U4B, each one stage of a multi-stage integrated circuit type SN75HC132 available from Texas Instruments, Inc.

It should be understood that the foregoing description is for the purpose of illustration only and this invention includes all modifications and equivalents which fall within the scope of the appended claims.

I claim:

1. An electronic processor of graphic signals for application to a facsimile recorder comprising:
 a primary input for signals in either of two different modes of frequency modulation;
 demodulation means including first and second filter channels coupled to the primary input and respectively passing different frequency bands of the input signal and having two filtered outputs corresponding to the different passed bands;

a pulse shaper with a square wave output and with two inputs respectively coupled to the two filtered outputs and responsive thereto to produce a square wave signal corresponding to both filtered outputs;

a first signal channel for coupling the output of one filter channel to a facsimile recorder; and a second signal channel for coupling the output of the shaper to the recorder, whereby input signals of two modulation modes are converted to a common mode of facsimile marking modulation.

2. A processor according to claim 1 wherein the filter channels are tunable respectively to pass different frequency bands.

3. A processor according to claim 2 including means responsive to the mode of the input signal to apply tuning signals to the filter channels.

4. A processor according to claim 1 wherein the filter channels are tunable to frequency modulated and frequency shift keyed bands.

5. A processor according to claim 1 wherein the filter channels are tunable to Teletype signal transmission frequency bands.

6. A processor according to claim 5 including means responsive to the mode of the input signal to apply tuning signals to the filter channels.

7. A processor according to claim 1 wherein at least one filter channel is tunable to facsimile signal transmission bands.

8. A processor according to claim 6 wherein at least one filter channel is tunable to facsimile signal transmission bands.

9. A processor according to claim 7 including means responsive to the mode of the input signal to apply tuning signals to the filter channels.

10. A processor according to claim 1 wherein the pulse shaper comprises a bistable flip-flop.

11. A processor according to claim 1 wherein each filter channel includes means for detecting the passed signal frequency band.

12. A processor according to claim 1 wherein one of the signal channels includes means for converting its signal into a mode for facsimile recording.

13. An electronic processor of graphic signals for application to a facsimile recorder comprising:

a primary input for signals in either of two different modes of frequency modulation;

demodulation means including first and second tunable filter channels coupled to the primary input and respectively passing different frequency bands of the input signal and having two filtered outputs corresponding to the different passed bands;

means associated to the primary input and responsive to the mode of the input signal to apply tuning signals to the filter channels;

a first signal channel for coupling the output of one filter channel to a facsimile recorder; and a second signal channel for coupling the pulse output of both filter channels to the recorder, thereby to convert signals of two frequency modulation modes to a common marking mode, so that either mode of signal can be coupled to the facsimile recorder.

14. An electronic processor of frequency shift keyed Teletype signals and frequency band modulated facsimile signals for application to a raster format facsimile recorder comprising:

a primary input terminal (1) for reception of both frequency shift keyed Teletype and facsimile modes of incoming signals;

modulation means including first (2) and second (3) tunable filter channels coupled to the primary input (1), each filter channel including means (21, 22-23, 32) tunable to upper and lower frequency pass limits thereby passing a selectable frequency band of the input signal, the two filter channels having respective filtered outputs (25,35) corresponding to different passed frequency bands, and each channel including tuning inputs selecting its passed frequency band;

means (6, 7, 8) connected between the primary input and filter channel inputs including means detecting the mode of the incoming signal and applying a corresponding tuning signal to the filter channels so as to select the passed frequency bands of respective channels;

a bistable flip-flop (4) with two inputs respectively connected to the outputs of the filter channels, the flip-flop having means producing a pulsed output with highs and lows corresponding to both filtered outputs;

a facsimile signal channel (F, 16) connected to one filter channel output;

a Teletype channel (T) connected to the flip-flop output; and means for selectively coupling the facsimile and Teletype channels to a facsimile recorder.

15. Apparatus according to claim 1 including an output terminal for each signal channel and switching means selectively coupling one of the two terminals to a processor output.

16. Apparatus according to claim 15 including a raster scanner facsimile recorder coupled to the processor output.

* * * * *